United States Patent
Broadley et al.

(10) Patent No.: US 11,253,917 B2
(45) Date of Patent: *Feb. 22, 2022

(54) MATERIAL PROCESSING SYSTEMS

(71) Applicant: Lake Region Medical, Inc., Chaska, MN (US)

(72) Inventors: Mark W. Broadley, Downington, PA (US); James Alan Sago, Solon, OH (US); John K. Eckert, Boyertown, PA (US); Jeffrey M. Farina, Zionsville, PA (US)

(73) Assignee: VIANT AS&O HOLDINGS, LLC, Tempe, AZ (US)

( * ) Notice: Subject to any disclaimer, the term of this patent is extended or adjusted under 35 U.S.C. 154(b) by 650 days.

This patent is subject to a terminal disclaimer.

(21) Appl. No.: 15/927,495

(22) Filed: Mar. 21, 2018

(65) Prior Publication Data

US 2018/0207724 A1     Jul. 26, 2018

Related U.S. Application Data

(60) Continuation of application No. 14/491,831, filed on Sep. 19, 2014, now abandoned, which is a division of application No. 13/039,176, filed on Mar. 2, 2011, now Pat. No. 8,840,832.

(51) Int. Cl.

| | | |
|---|---|---|
| *B22F 3/20* | (2006.01) | |
| *B29C 48/78* | (2019.01) | |
| *B29C 48/355* | (2019.01) | |
| *B28B 3/20* | (2006.01) | |
| *B28B 11/24* | (2006.01) | |
| *B22F 3/24* | (2006.01) | |
| *B22F 3/10* | (2006.01) | |
| *C04B 35/64* | (2006.01) | |
| *C08K 3/08* | (2006.01) | |
| *C08K 3/34* | (2006.01) | |

(Continued)

(52) U.S. Cl.
CPC .............. *B22F 3/20* (2013.01); *B22F 3/1021* (2013.01); *B22F 3/24* (2013.01); *B28B 3/20* (2013.01); *B28B 11/248* (2013.01); *B29C 48/355* (2019.02); *B29C 48/78* (2019.02); *C04B 35/64* (2013.01); *B22F 2003/242* (2013.01); *B22F 2003/247* (2013.01); *B29K 2103/04* (2013.01); *B29K 2103/06* (2013.01); *C04B 2235/6021* (2013.01); *C08K 3/08* (2013.01); *C08K 3/34* (2013.01); *Y10T 428/2922* (2015.01)

(58) Field of Classification Search
CPC ....................................................... B22F 3/20
See application file for complete search history.

(56) References Cited

U.S. PATENT DOCUMENTS

| | | |
|---|---|---|
| 3,744,946 A | 7/1973 | Lang |
| 5,897,587 A | 4/1999 | Martakos et al. |
| 2006/0018780 A1 | 1/2006 | Hosamani et al. |

(Continued)

*Primary Examiner* — Christopher S Kessler
(74) *Attorney, Agent, or Firm* — Grossman, Tucker, Perrault & Pfleger, PLLC

(57) ABSTRACT

Material processing systems are disclosed. Some systems include methods of eliminating or reducing defects in elongate workpieces that can undergo large deformations during processing. Some systems include apparatus configured to facilitate such large deformations while maintaining internal stresses (e.g., tensile stresses) below a threshold stress. Some disclosed systems pertain to powder extrusion techniques. Continuous and batch processing systems are disclosed.

17 Claims, 7 Drawing Sheets

(51) Int. Cl.
  *B29K 103/04*    (2006.01)
  *B29K 103/06*    (2006.01)

(56) References Cited

U.S. PATENT DOCUMENTS

| | | |
|---|---|---|
| 2006/0246389 A1 | 11/2006 | Crawford et al. |
| 2010/0178194 A1 | 7/2010 | Broadley et al. |
| 2011/0033772 A1 | 2/2011 | Tucker et al. |

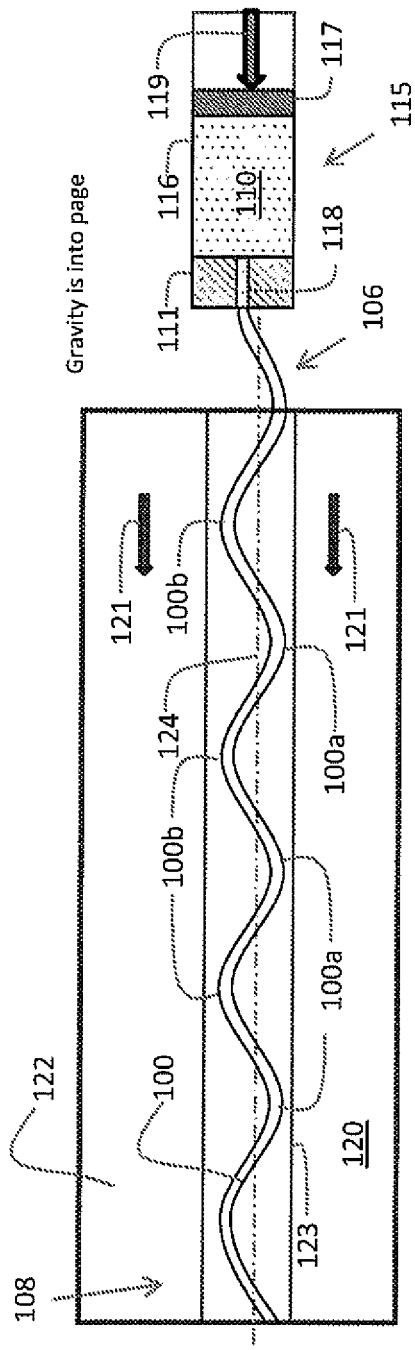
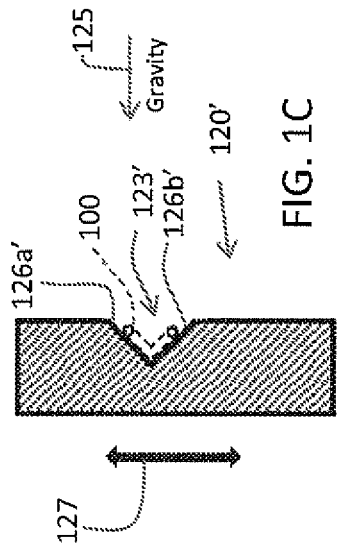
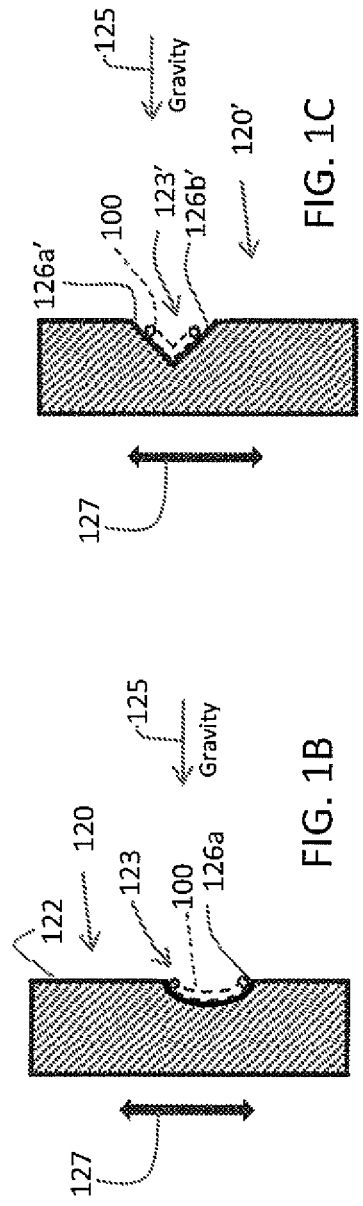
FIG. 1A
FIG. 1B
FIG. 1C

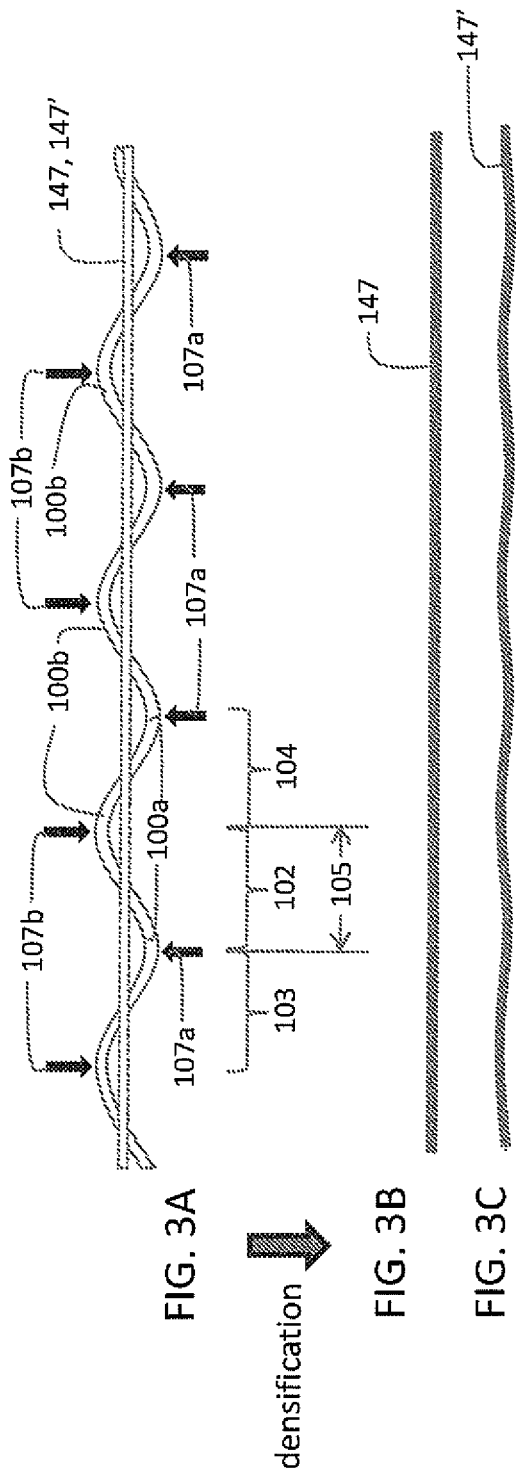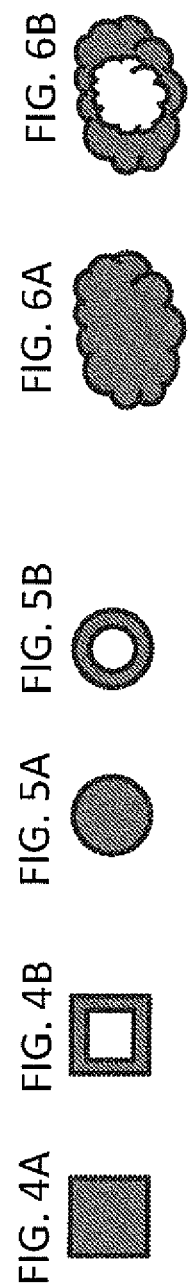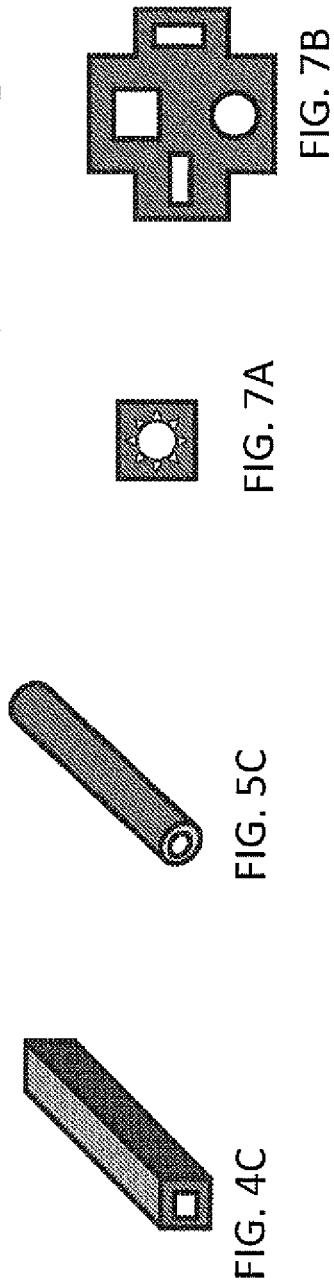

MATERIAL PROCESSING SYSTEMS

CROSS-REFERENCE TO RELATED APPLICATIONS

This application is a continuation of application Ser. No. 14/491,831, filed on Sep. 19, 2014, which is a divisional of application Ser. No. 13/039,176, filed on Mar. 2, 2011, now U.S. Pat. No. 8,840,832.

BACKGROUND

The innovations disclosed herein pertain to material processing systems, and more particularly, but not exclusively, to systems for producing elongate articles using extrusion techniques, such as, for example, powder metal and/or ceramic extrusion techniques. Some disclosed systems relate to producing an elongate article from a workpiece or from a material that undergoes a large strain during processing without fracturing the workpiece. Such materials can include compositions of feedstock including a mixture of a powdered bulk material and a binder system. Some disclosed systems pertain to continuous processing of materials, and more particularly, but not exclusively, to continuous processing of an elongate workpiece. Other disclosed systems pertain to products formed by processing an elongate workpiece from a material that undergoes large strains during processing.

Conventional powder processing systems, such as, for example, Metal Injection Molding (MIM) are not amenable to producing elongate articles for a number of reasons described below. Nonetheless, MIM techniques possess a number of advantages compared to conventional machining processes applied to wrought materials. For example, material properties arising from MIM techniques can approach those of wrought materials. Additionally, MIM techniques have been used to produce molded articles having intricate or complex shapes that traditionally have not been attainable by machining wrought materials. MIM techniques have also been used to produce net and near net molded articles having little dimensional variance (sometimes referred to as "close tolerances"), and to produce plural articles in one mold, thereby reducing production and/or assembly costs compared to traditional manufacturing techniques. MIM techniques have been used to produce molded articles for industries such as agricultural, automotive, business machine, electronics, food & beverage, hardware, medical, small appliance, and sporting goods.

A disadvantage to metal injection molding techniques has been their discrete nature, which limits a number of article units that can be produced in a given batch (or "press cycle"). Press cycle rate can be controlled in part by a time required to fill mold cavities with feedstock and to cool the resulting molded part sufficiently that it can be removed from the mold. Another disadvantage of metal injection molding is the difficulty in producing molded articles of substantial length in part because elongate articles formed using conventional MIM techniques fracture as they shrink during consolidation processes (e.g., debinding and sintering), in many instances. Yet another disadvantage of metal injection molding is the high cost of the molds which can produce only one particular molded part per mold cavity.

U.S. application Ser. No. 12/319,723, filed Jan. 12, 2009, published as U.S. Publication No. 2010/0178194 on Jul. 15, 2010, and assigned to the assignee of this application, discloses, among other things, systems pertaining to powder metal processing. For example, U.S. application Ser. No. 12/319,723 discloses methods that include extruding a mixture through a die to produce a green form, debinding the green form to produce a brown form, sintering the brown form to produce a densified form, and processing the densified form to produce an article. In some instances, such methods include receiving the green form on a setter tray and tilting the setter tray during debinding, thereby reducing the tendency of friction between the setter tray and the long form to cause a fracture in the form. U.S. application Ser. No. 12/319,723 is hereby incorporated by reference in its entirety, for all purposes.

U.S. Pat. No. 3,697,262, filed Jan. 15, 1971, discloses a method of handling shrinkable material. In particular, the '262 patent discloses conveying an elongated green metal component in a sinuous configuration through a furnace, enabling use of a short furnace. The '262 patent states "Importantly, the elongated component of sinuous configuration may lie in successively supported loops in a vertical plane . . . which allows for the progressive longitudinal shrinkage of the elongated green metal component . . ." '262 patent, column 4, lines 18-27. The '262 patent discloses an elongated green metal component draped over a plurality of spaced apart pins 30. The spaced apart pins provide discrete locations of support to the green metal component, leaving portions of the green metal component spanning the gaps and hanging unsupported between adjacent pins. The unsupported and hanging portions of the green metal component constitute a vast majority of the component. Spaced apart ropes 26 pass through and are secured in the slotted ends of the pins 30, preventing the pins from rotating about a longitudinal axis of the pin. Thus, as the green metal component shrinks during processing, the internal stresses must overcome gravity and lift the weight of the unsupported portions, must overcome a static or sliding friction between the component and a corresponding pin, or both. Such support arrangements are unsuitable for processing some feedstock compositions since the internal stresses arising from such support configurations exceed a critical threshold (e.g., a yield stress, stress rupture strength, an ultimate stress) of such feedstock compositions, leading to defects (e.g., fractures, necking (e.g., a reduction in cross sectional area of an article), or unsuitable microstructures) in densified or finished articles.

Accordingly, there remains a need for systems capable of producing articles of virtually any length from materials that undergo large shrinking (or negative) strains during processing, such as powered bulk materials while keeping internal stresses below a critical threshold. For example, there remains a need for systems capable of producing a long article which may be cut or otherwise segmented to form articles having one or more selected lengths from such materials. A need also remains to produce one or more elongate articles at a higher rate than molded articles currently can be produced using MIM techniques. A need remains for a system capable of producing non-molded articles having any desired cross-sectional profile while avoiding or reducing a likelihood of a fracture or other defect occurring in the finished article using relatively low cost, flexible tooling. Such non-molded articles can include, for example, solid, hollow, and multi-lumen shapes. There also remains the need for systems capable of producing non-molded articles of net or near net shape while avoiding or reducing a likelihood of shrinkage-related defects in the finished article.

SUMMARY

The following describes innovative material processing systems by way of reference to embodiments of powder extrusion systems that address one or more of the foregoing or other needs of the prior art. Some embodiments of such innovative systems include apparatus configured to process an elongate, extruded form. Other such innovative systems include methods for processing such a form.

In particular, apparatus and methods are disclosed that facilitate batch and/or continuous processing of elongate green forms into elongate brown forms, and, in some embodiments, into finished elongate, non-molded articles, while avoiding or reducing a likelihood of shrinkage-related defects in the elongate member. These and other previously unattainable advantages are made possible, at least in some instances, by facilitating a change in longitudinal dimension (e.g., shrinking) of the elongate member while simultaneously maintaining internal stresses of the member below a critical threshold (e.g., below a yield, stress rupture strength or an ultimate tensile stress of the material).

Such stresses can arise from static and/or sliding friction between a support member and an elongate member as the elongate member shrinks during processing. As the member shrinks, one portion of the member can slide along the support member at a rate that differs from a rate another portion of the member slides along the support member, introducing tensile stresses in a region of the member positioned between the portions. Unless a material processing system is adapted to address such large strains (e.g., between about 10% and about 30%, such as between about 15% and about 25%) that are common during, for example, powder extrusion processing, a tensile stress in one or more regions of the elongate member can exceed a critical threshold (e.g., a yield stress, a stress rupture stress or an ultimate stress), resulting in a defect (e.g., a fracture, necking or other reduction in cross sectional area of an article, or undesirable microstructure) in the processed elongate member.

Innovative material processing systems disclosed herein can produce a finished elongate article, such as, for example, a medical device or a component thereof. Some feedstocks used to form the article can include a biocompatible composition suitable for use in an implantable medical device.

Methods of densifying (e.g., sintering, mechanical processing, thermal processing and/or thermo-mechanical processing) an elongate form while maintaining internal stresses below a critical threshold are disclosed. In disclosed methods, an elongate workpiece includes a shaped feedstock of metal and/or ceramic particles in combination with a binder. The workpiece is introduced into a densification (e.g., a sintering) apparatus. In some instances, the elongate workpiece is positioned such that its length is greater than a straight line distance between two points along a centerline longitudinally bisecting the workpiece. For example, the workpiece can be sinuously arranged such that about half of the workpiece lies on one side of the centerline and about half of the workpiece lies on an opposing side of the centerline. The elongate workpiece can also be oriented transversely relative to a direction of gravity. By so positioning the workpiece, movement of the workpiece is facilitated, such as by a force of gravity, so the workpiece's configuration can adapt to and relieve internal stresses. The workpiece can be densified (e.g., sintered) to produce a consolidated article in a manner that avoids (or reduces the likelihood of) fractures or other stress-related defects.

The workpiece can be substantially continuously supported by a support member configured to introduce the workpiece into the densification apparatus. In some instances, the sinuously arranged workpiece defines a sinusoidal path.

As used herein, "providing substantially continuous support" means providing sufficient support to a workpiece to prevent the workpiece from sagging under the force of gravity between adjacent points or regions of contact between the workpiece and the support member. For example, a smooth surface can provide substantially continuous support to a workpiece. In some instances, such a smooth surface can be generally planar. Alternatively, a surface defining a plurality of ridges that contact, and thereby urge against, corresponding portions of a workpiece while other portions of the workpiece span regions between the ridges can provide substantially continuous support to the workpiece, provided that the ridges are sufficiently close to each other that portions of the workpiece spanning the regions do not sag under the force of gravity. Alternatively, a support member including a mesh structure, a plurality of pins, a plurality of rollers, a plurality of movable or fixed spheres, or a combination thereof, can provide substantially continuous support to a workpiece, provided that the portions of the workpiece spanning between portions of the workpiece in contact with the support member do not sag. In at least some embodiments, one or more features extending from a support member are configured such that the features do not dent, form a detente, flatten or otherwise locally deform a surface of a workpiece resting against the one or more features.

As noted above, the workpiece can be sinuously arranged such that it is longer than a straight line distance between two points on a centerline bisecting the workpiece, providing a measure of slack in the workpiece so it can deform in response to internal stresses that can arise during densification processes. The straight line distance along the centerline can be about the same as a length of the workpiece following sintering, such that the consolidated article is substantially straight. In other instances, the straight line distance along the centerline is less than a length of the workpiece following the sintering, such that the consolidated article maintains an undulating shape after sintering.

The support member can include at least a first inclined wall and the workpiece can rest along at least a portion of the wall. The support member can define a second inclined wall opposing and adjoining the first inclined wall so as to define a recessed region, or valley, having a selected depth positioned between the first wall and the second wall. The first wall and the second wall can support respective portions of the workpiece.

For example, the support member can define a substantially V-shaped notch defining the inclined wall and the second inclined wall. The workpiece can be sinuously arranged within such a V-shaped notch or L-shaped recess. For example, the workpiece can define a substantially sinusoidal path along one or both of the walls forming the V-shaped notch.

In other embodiments, the inclined wall and the second inclined wall can define a generally L-shaped recess. The workpiece can define a substantially sinusoidal path substantially continuously supported, for example, along the first inclined wall forming a long leg of the L-shaped recess. The work piece can contact the second inclined wall forming a short leg of the L-shaped recess, such as at points along a deepest region of the recess. In such an embodiment, the workpiece can be generally centered on the long leg of the L-shaped recess with apices of the sinuously arranged workpiece extending upward and downward along a plane of the long leg of the L-shaped recess.

In other embodiments, the walls and the recessed depth define a substantially U-shaped recess extending longitudinally of the support member. The workpiece can be sinuously arranged within the U-shaped recess. The workpiece can define a substantially sinusoidal path within the U-shaped recess. The centerline of the recess can extend along a deepest region of the recess such that the workpiece is generally centered within the recess and apices of the sinuous workpiece extends upwardly along the walls.

The workpiece can be produced by extruding a feedstock through an extrusion die. A first portion of the workpiece can be extruded at the same time a second portion of the workpiece is being introduced into a densification apparatus.

The workpiece can be debound before it is introduced to a sintering apparatus. Such debinding of one portion of the workpiece can occur simultaneously with sintering and/or extruding other portions of the workpiece.

The densified (e.g., sintered) workpiece can be processed to produce an elongate finished article. The finished article can be wound onto a spool, which can occur simultaneously with extruding, debinding or sintering other portions of the workpiece.

Support members compatible with such material processing systems are also disclosed. Some support members are configured to facilitate movement of a workpiece along the support member while the workpiece shrinks during a densification process. For example, some disclosed support members are configured to enable gravitationally aided sliding of an extruded workpiece. Other support members include a plurality of juxtaposed support members, such as, for example, rollers, stationary pins, stationary spheres, hemispheres or other sections of spheres, and/or spheres configured to rotate (e.g., freely rotate) about one or more axes. In some embodiments, a sphere configured to rotate about one or more axes can rotate like a ball bearing. Some support members include a continuous belt. Disclosed support members can reduce the occurrence of stress-induced defects, such as those resulting from shrinkage.

A workpiece can be received by a support member. In some instances, the workpiece can be sinuously arranged on the support member. The support member can be moved away from an extrusion die slower than the workpiece is ejected from the extrusion die to allow the workpiece to be sinuously arranged on the support member. In some instances, the support member is configured to oscillate in a transverse direction relative to a direction of ejection of the green form from an extrusion die, thereby facilitating the sinuous arrangement of the workpiece.

Powder extrusion apparatus are disclosed. Such apparatus include an extrusion die defining an aperture corresponding to a selected outer profile of a workpiece. Such apparatus also include a support member configured to substantially continuously support the extruded workpiece (or green form). In some instances, the support member supports the green form in an orientation transverse to a direction of gravity. The support member can be configured to allow the green form to shrink during processing without fracturing. Such powder extrusion apparatus can include a continuous densification apparatus.

The foregoing and other features and advantages will become more apparent from the following detailed description, which proceeds with reference to the accompanying drawings, which are incorporated herein and constitute a part of this specification.

BRIEF DESCRIPTION OF THE DRAWINGS

The accompanying drawings show aspects of the innovative systems disclosed herein, unless specifically identified as showing a known feature from the prior art.

FIG. 1A illustrates a powder extrusion apparatus and a sinuously arranged workpiece.

FIG. 1B shows a cross-sectional view of one embodiment of a support member of the type shown in FIGS. 1A and 2.

FIG. 1C shows a cross-sectional view of another embodiment of a support member of the type shown in FIGS. 1A and 2.

FIG. 3A schematically illustrates a sinuously positioned workpiece undergoing a densification process in which the workpiece shrinks. FIG. 3B shows a possible configuration of the workpiece after densification and shrinkage of the workpiece. FIG. 3C shows an alternative possible configuration of the workpiece after densification and shrinkage of the workpiece.

FIGS. 4A through 14 show various configurations of extruded workpieces.

FIG. 4A shows a cross-sectional view of a workpiece having a solid rectangular cross-section. FIG. 4B shows a cross-sectional view of a workpiece having a hollow rectangular cross-section. FIG. 4C shows an isometric view of the workpiece shown in FIG. 4B.

FIG. 5A shows a cross-sectional view of a workpiece having a solid circular cross-section. FIG. 5B shows a cross-sectional view of a workpiece having an annular cross-section. FIG. 5C shows an isometric view of the workpiece shown in FIG. 5B.

FIG. 6A shows a cross-sectional view of a workpiece having an arbitrary solid cross-section. FIG. 6B shows a cross-sectional view of a hollow workpiece having an arbitrarily shaped external profile and an arbitrarily shaped internal profile.

FIGS. 7A and 7B show cross-sectional views of workpieces having a plurality of longitudinally extending lumens.

FIG. 8 shows an isometric view of a workpiece having a plurality of walls and channels.

FIG. 9 shows an isometric view of a workpiece having a plurality of longitudinally extending lumens and a circular external profile.

FIG. 10 shows an isometric view of a workpiece having a circular external profile and a lumen with a hexagonal profile.

FIG. 11 shows an isometric view of a workpiece having a threaded external surface and a longitudinally extending hexagonal lumen.

FIG. 12 shows an isometric view of a workpiece having an ovular external profile and a circular lumen extending longitudinally of the workpiece.

FIG. 13 shows an isometric view of a T-shaped workpiece having a plurality of longitudinally extending lumens.

FIG. 14 shows a partial side-elevation view of a support member having a plurality of rollers or pins supporting a workpiece during a densification process.

DETAILED DESCRIPTION

Various principles related to powder extrusion systems are described herein by way of reference to exemplary systems.

One or more of the disclosed principles can be adapted to various system embodiments to achieve one or more selected system characteristics. Systems relating to powder extrusion processing are merely examples of innovative material processing systems and are described to illustrate aspects of the various principles disclosed herein. Some embodiments of disclosed innovations may be equally applicable to use in other applications, such as, for example, systems adapted for processing materials that undergo anisotropic strains, with large negative strains in one or more dimensions. Other embodiments of disclosed innovations may be equally applicable to use in applications related to processing elongate molded forms using aspects of conventional MIM techniques.

Overview of Innovative Material Processing Systems

Material processing systems as disclosed herein can facilitate production of finished articles having low rates of, or no, stress-induced defects, particularly such defects arising, at least in part, from shrinkage of a workpiece during consolidation processing. As explained above, friction between a workpiece as it undergoes a large shrinkage strain during processing and a member supporting the workpiece can induce defects in a finished article. Methods and apparatus are described that can facilitate such large strains (e.g., part shrinkage) that can arise during processing, for example, an extruded powder-based feedstock.

Figure 1D:
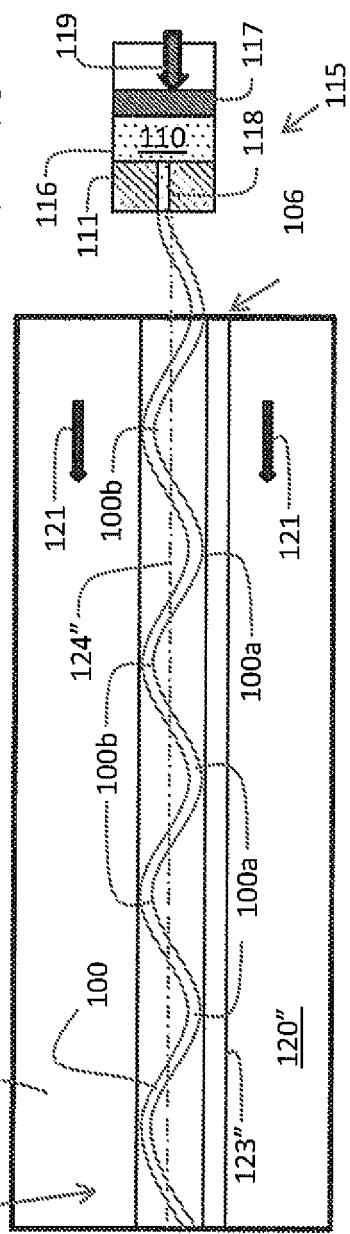
FIG. 1D illustrates an alternative embodiment of a powder extrusion apparatus and a sinuously arranged workpiece.
Figure 2:
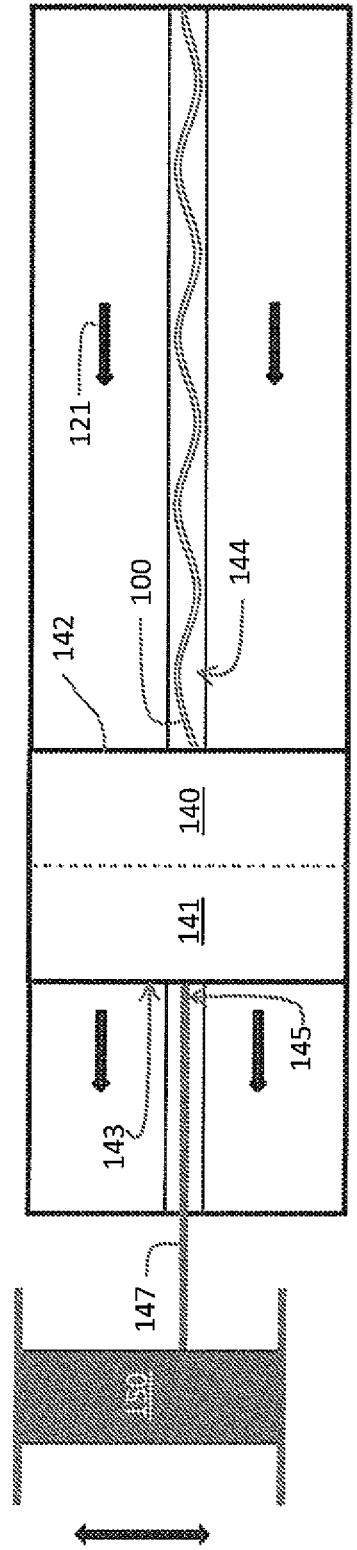
FIG. 2 illustrates a support member, a continuous debinder and a continuous sinterer.

An elongate workpiece can be formed from a variety of materials (e.g., powder metal, powder ceramic, plastic) using any of a variety of techniques. For example, the workpiece can be a molded workpiece of the type formed using any of a variety of conventional pressure forming techniques suitable for shaping compounds having a powder metal, a powder ceramic, a polymer or other material, such as, for example, direct compression molding, isostatic molding, injection molding. Alternatively, the workpiece can be extruded from a feedstock. In some instances, as shown in FIGS. 1A, 1D and 2, a workpiece 100 can be continuously extruded from an extruder 115 to form a continuous elongate workpiece from a feedstock 110.

The feedstock 110 can include a material that undergoes large strains during subsequent processing of the workpiece. To facilitate such large strains and to avoid or mitigate effects of any corresponding stress-induced defects, the workpiece 100 can be positioned on a support member (e.g., a setter tray) 120, 120', 120" (FIGS. 1B, 1C, 1E, respectively) such that the workpiece extends nonlinearly between two points A and B on the support member. In such a position, a length of the workpiece 100 extending between the two points A and B is greater than a linear distance between the two points. For example, the elongate workpiece 100 can be positioned on the support member 120, 120', 120" such that its longitudinal axis (not shown) defines an approximately sinusoidal shape. Other non-linear shapes are also possible, as described more fully below.

A workpiece 100 positioned as just described can accommodate subsequent processing-induced strains (e.g., "shrinkage") without forming stress-induced defects in the workpiece from such shrinkage. For example, as shown in FIGS. 3A, 3B and 3C, as the workpiece 100 contracts during processing, portions 100a, 100b of the workpiece lying on opposing sides of a centerline 124, 124" (FIGS. 1A, 1D) of the nonlinear workpiece approach the centerline aided by a component of the force of gravity applied to the workpiece in a direction parallel to the support member surface supporting the workpiece 126. As the workpiece 100 shrinks, internal stresses in a given portion of the workpiece mostly or wholly correspond to static and/or sliding friction between near-region portions 103, 104 (FIG. 3A) of the workpiece and the support member 120, 120', 120" (FIGS. 1A, 1C, 1E), and the force of gravity, keeping internal stresses below a threshold stress (e.g., below a yield stress, a stress rupture stress or an ultimate stress of the material or materials forming the workpiece).

Since internal stresses can correspond to a static and/or sliding friction between near-region portions 103, 104 of the workpiece 100 and the support member 120, internal stresses that a workpiece experiences during processing can be controlled, at least in part, by the arrangement of the workpiece on the support member and a selected configuration of the support member (e.g., a configuration of a recess or other feature defined by the support member). For example, as a distance 105 (FIG. 3A) between portions 100a, 100b of the workpiece that have different curvature (e.g., concave or convex) is reduced, internal stresses in a region 102 of the workpiece between the portions can correspondingly reduce when the workpiece shrinks. Alternatively, as the distance 105 between portions increases, the internal stresses can correspondingly increase.

In addition, as a steepness of the walls, forming a V-shaped notch 126a', 126b' (FIG. 1C), an L-shaped recess 126a", 126b" (FIG. 1E), or a U-shaped trough 126a (FIG. 1B) increases (e.g., approaches a vertical wall parallel to gravity), the force of gravity applied to the workpiece in a direction of shrinkage increases, increasing the assistance gravity provides to a shrinking part, and, thereby, correspondingly reducing internal stresses in the workpiece.

Continuous processing systems are also disclosed. For example, a feedstock 110 (FIGS. 1A and 1D) can pass through an extrusion die 111 to form a workpiece portion 106. The workpiece portion 106 can be received by a receiver 120, 120', 120" configured to carry the portion through one or more subsequent processes described below (e.g., a debinding process, a sintering process). For example, the receiver (or support member) 120 can carry the workpiece portion 106 from the extruder 115 to a debinder 140 (FIG. 2), to a sincerer 141, and, subsequently, to a spooler 150.

A feedstock 110 can include a mixture of a powdered bulk material (e.g., a mixture containing one or more of a powdered metal and a powdered ceramic) and a binder system. The binder system can include an agar, reactive, thermally unstable or aromatic (e.g., naphthalene or paradichlorobenzene) binder system, which dries, reacts to form a gas, decomposes to a gas or sublimes at relatively low temperatures, such as, for example, below about 500° F., such as between about 120° F. and about 450° F.

Such systems can facilitate continuous debinding of the extruded workpiece 100. For example, a debinding heater or furnace can define opposed first and second open ends and an interior heated region. The elongate workpiece 100 can extend from a region outside the first open end to a region outside the second open end and through the interior heated region. The heated region of the furnace can heat the portion of the workpiece exposed to the heated region. Heating the portion of the workpiece can cause the binder system to evaporate, melt, react, decompose and/or sublimate, removing the binder system from the heated portion of the workpiece.

In FIG. 2, the elongate workpiece 100 is shown extending through a debinding heater or furnace 140 and a sinterer 141. A green form portion 144 enters through a first opening 142 in the debinder 140 and a brown form (not shown) leaves the debinder and enters the sinterer 141. The support member 120 carries the densified form 145 from the sinterer 141 through an exit opening 143. In some instances, the support member 120 is configured as an endless belt configured to continuously carry the elongate workpiece 100 from the extruder 115, through the debinding heater 140, through the sinterer 141 and to a subsequent processor (e.g., a spooler 150). Other support member configurations are described below.

Extrusion Systems

Powder extrusion techniques can produce an elongate workpiece (and ultimately a finished article) 100 having a selected cross-sectional profile. In some embodiments, such a technique can continuously form an elongate workpiece with separate portions (e.g., portions 144, 145) that are simultaneously processed in different stages. Such techniques can continuously form an elongate finished article 147 (FIG. 1).

For example, in FIG. 1, an extruder 115 is configured to urge a feedstock 110 through an extrusion die 111 to form the elongate workpiece 100. A support member 120 can support the ejected workpiece, such as by receiving a newly formed portion 106 of the elongate workpiece adjacent the extrusion die 111. The support member 120 can carry the portion in a direction away from the extrusion die 111 (indicated by arrows 121) such that additional feedstock can pass from the die and be received and supported by the support member.

In FIGS. 1A and 1D, the extruder 115 has a reservoir 116 configured to receive a feedstock 110. A feedstock pressurizer 117 (e.g., a piston, a screw-driven extrusion press, or other pressurizer) can urge against the feedstock 110, thereby pressurizing the feedstock in the reservoir. The extrusion die 111 defines an aperture 118 exposed to the pressurized feedstock. As the pressurized feedstock 110 flows through the aperture 118, it assumes a cross-sectional profile corresponding to a cross-sectional profile of the aperture, forming the elongate workpiece 100. As feedstock 110 flows from the reservoir 116 through the aperture 118, the feedstock pressurizer 117 can translate or otherwise move to continue urging against the feedstock remaining in the reservoir (indicated by arrow 119).

During extrusion, external heat is typically applied to the feedstock to make it flowable, and frictional heat can be generated as the feedstock passes through the die. Accordingly, the die 111 is typically constructed with internal cooling passages (not shown). Cooling the die 111 serves to solidify the flowable mixture (feedstock) as it emerges from the die as a green form workpiece 100. The overall dimensions of the die aperture 118 can be selected to be larger than those of a desired completed article 147 to account for shrinkage of the workpiece 100 during subsequent processing (e.g., debinding and sintering).

During extrusion of the mixture, temperature, pressure, shear, and velocity within the extruder 115 can be controlled to enable production of a sound, pore-free product using known techniques. Temperature is preferably controlled by using external heaters. In addition, shear heating may be controlled by regulating the extrusion rate. The extrusion temperature can be dependent on process factors including a composition and size bulk material powders, a composition of the binders, and a ratio of bulk material powders to binders in the mixture, as well as on a rate of extrusion, among other parameters. The feedstock temperature can be less than about 950° F. such as, for example, in the range of about 200° F. to about 650° F., and can be higher than 950° F. if the binder materials used to carry the bulk material powders have a correspondingly higher melting temperature.

Pressure can be controlled by regulating the feed rates of the pressurizer 117. For a screw-driven press, the feed rate can result from a combination of the speed and capacity of the screw. In addition pressure may be controlled by regulating a temperature of the feedstock. The extrusion pressure can depend on process factors including the composition and size of the bulk material powders, the composition of the binders, and the ratio of bulk material powders to binders in the mixture, as well as on the rate of extrusion. The pressure can be in the range of 50 PSI to 7500 PSI, but can be higher or lower depending upon variations in the process factors.

Shear and velocity are incidentally controlled and are generally a result of a combination of several inputs, including but not limited to extrusion rates, the composition and size of the bulk material powders, the composition of the binders, the ratio of bulk material powders to binders in the mixture, temperature, pressure, draw down, and quenching. Shear coefficients within the feedstock 110 can range from a nearly shear-free value of about 0.998 to a turbulent value of about 0.005. Shear can depend on factors including tooling design (i.e., the shape of the die and the optional a mandrel), feed rate, and internal and external friction characteristics of the materials in the mixture being extruded. Shear may cause or induce stress concentrations and other undesirable properties in the green form. Ultimately, the undesirable properties imparted to the green form by shear during extrusion can be removed in a subsequent sintering step or by other thermal, mechanical, and/or ~thermomechanical processing steps.

A continuous extrusion technique can produce long workpieces, and in some instances, continuous workpieces that can be continuously processed. For example, a continuous powder extrusion technique can produce a continuous elongate form of a desired profile whose length is theoretically limited only by the processing equipment or factory in which it is produced, and the need for a steady flow of input mixture. If a continuous sintering oven is set up in sequence with the extruder, theoretically, an infinite length of extrusion can be continuously debound and sintered into a densified form. In practice, an extruded article can be produced in sections having lengths ranging from about 1 foot to about 20 feet, although longer or shorter sections can also be produced. For example, sections measuring in excess of hundreds of feet, and in some instances, sections measuring in excess of thousands of feet, are possible.

As used herein, a "continuous" process differs from a conventional discrete or batch process. For example, continuous powder extrusion techniques offer increased efficiency when compared with discrete operations such as metal injection molding techniques. In contrast to discrete metal injection molding approaches, where parts are produced individually or in discrete batches, a continuous powder extrusion technique can produce a workpiece segment having an equivalent length to hundreds, thousands or more discrete parts and having a substantially constant profile using a single extrusion cycle.

Also, continuous powder extrusion techniques offer lower cost and greater flexibility of the dies and more flexible tooling options compared to conventional discrete (e.g., MIM) techniques. For example, an extrusion die costs about 10% of the cost of a multi-cavity MIM die, and can be used for other products by mixing and matching dies and optional mandrels to produce a wide range of extruded green form shapes. Accordingly, a die 111 (or a die and a mandrel) of an extruder 115 (FIG. 1) can easily be replaced inexpensively. In contrast, a die of a MIM machine can be replaced but at greater expense.

Workpieces

An article produced using an extrusion technique can define a net form, a near net form, or a preform. Materials forming a net form, a near net form, and a preform can have essentially the same physical or mechanical properties; the terms "net form", "near net form", and "preform" merely denote relative dimensions of an article subsequent to sintering as compared to dimensions of a finished part.

As used herein, a "net form" means an article having desired dimensions of a finished part subsequent to extruding, debinding and sintering.

As used herein, a "near net form" means an article having nearly the desired dimensions of a finished part subsequent to extruding, debinding, and sintering. A near net form can have dimensions slightly larger than or slightly smaller than the desired dimensions, depending on the extent and type of subsequent processing contemplated.

As used herein, a "preform" means an article having dimensions that are larger or smaller than the desired dimensions of a finished part subsequent to extruding, debinding and sintering, or an article having a shape that differs from such a finished part. A preform can be smaller than net size, where, for example the preform will be upset (deformed in such a way that the length is reduced along the original extrusion axis).

Typically, a preform undergoes subsequent processing (e.g., segmenting, mechanical, thermal or thermo-mechanical treating) to attain one or more desired dimensions of the finished part. Net forms and near net forms generally do not require further mechanical processing after sintering.

To produce forms having a net or near net size, particularly parts having a small cross-section and smooth surface requirements, a selected bulk material can include fine metal, ceramic, or metal and ceramic powders. Such bulk materials can include fine metal powders having a particulate diameter of less than about 50 microns. Bulk materials can include fine metal powders having a diameter of less than about 25 microns. Small net or near net parts may include, but are not limited to, surgical screw blanks, and multi-lumen cannulas.

As shown in FIG. 4A through FIG. 13, an extruded workpiece 100 can have a solid or a hollow cross-sectional profile. For example, a feedstock 110 can form an elongate workpiece 100 having a circular, outer cross-sectional profile as the feedstock passes through a circular aperture in an extrusion die 111. Other cross-sectional profiles are also possible, as described below.

To form a lumen within an extruded workpiece, a mandrel (not shown) can be positioned within the aperture 118 of the die 111 to obstruct one or more regions of the aperture and thereby prevent feedstock 110 from flowing through the obstructed region(s). As feedstock 110 flows through the unobstructed region(s) of the aperture, it forms one or more walls and the resulting workpiece 100 can define a hollow region (e.g., lumen 119 in FIG. 5C) extending longitudinally of the workpiece and corresponding to the region of the aperture obstructed by the mandrel. For example, a circular mandrel can form a hollow region having a corresponding circular cross-section extending through the workpiece. By way of further example, a circular mandrel positioned concentrically within a circular die aperture can define an unobstructed annulus. Feedstock flowing through such an unobstructed annulus can define an elongate workpiece having an annular cross-sectional profile (e.g., an elongate tubular member), as shown in FIGS. 5B and 5C.

Figure 9:
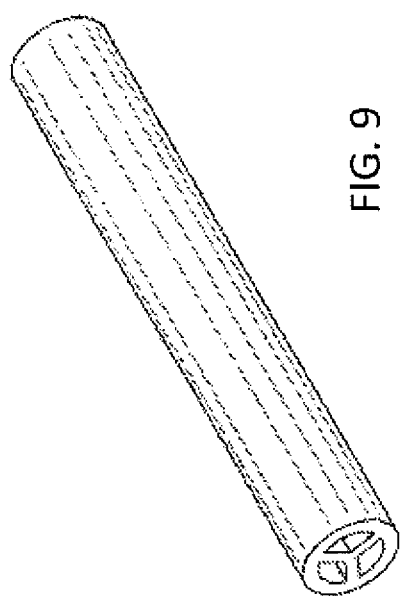
Figure 10:
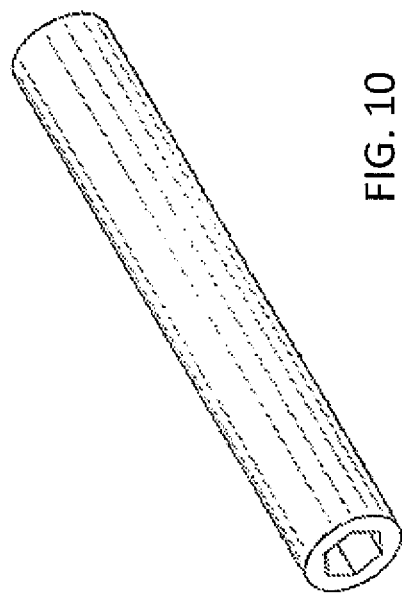
Figure 8:
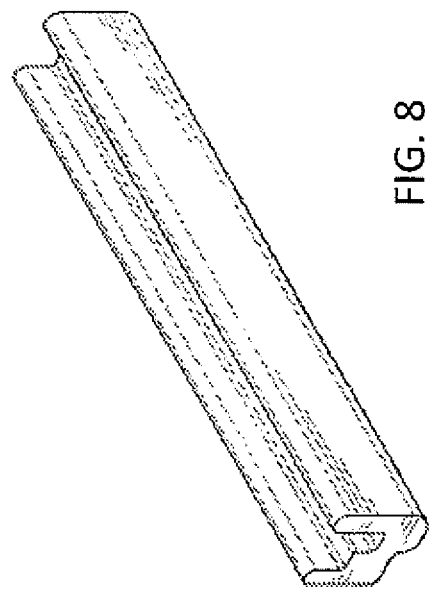
Figure 13:
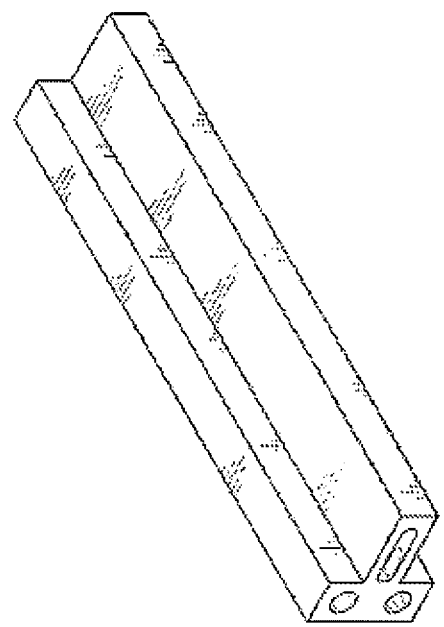
Figure 11:
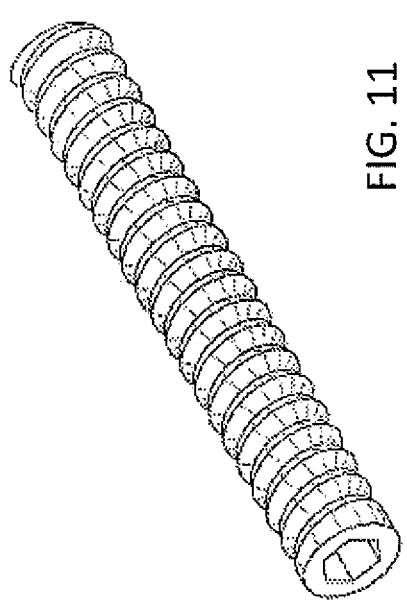
Figure 12:
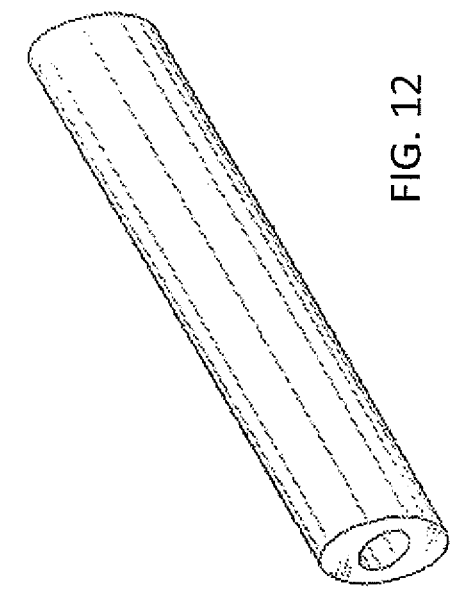

Other aperture- and mandrel-profiles can be combined to form extruded workpieces having corresponding cross-sectional profiles. Such profiles are shown, for example, in FIG. 4A through FIG. 13. Such profiles can include, for example, a combination of a round external shape with a hexagonal internal shape (FIG. 10), or a round multi-lumen hypotube or surgical tube (FIG. 9). Other possible cross-sections include external profiles having round, oval, rectangular, or a combination of flat and arcuate surfaces, such as a symmetrical and nonsymmetrical polygons, as well as T-sections, U-sections, L-sections, I-sections, or virtually any regular or irregular permutation thereof. Such workpieces can be extruded and subsequently sintered, and if desired, subsequently processed to produce low-cost seamless metallic tubing compared to existing conventional techniques.

An elongate workpiece can be subsequently processed into a finished article 147 (FIG. 2). The finished article 147 can be cut to a net length and/or can be spooled, as shown in FIG. 2. As used herein, a "net length" means a finished length of a finished article. As used herein, a "net size" means a finished size of a finished article. Further finishing by thermal and various other processes can be applied the finished article to refine one or more properties (e.g., a material property, a dimension, an appearance) of the article.

Feedstock

A suitable feedstock 110 can include a mixture of one or more bulk materials and a binder system, as described below. In some powder extrusion techniques disclosed herein, a bulk material can include a powdered bulk material. Such a powdered bulk material may be elemental, master alloy, or prealloyed. A bulk material can include a powder capable of forming various metals and alloys. Such bulk materials may include, but are not limited to, powders capable of forming any metals and alloys suitable for the medical industry, in particular metals and alloys suitable for implantation. Such bulk materials may also include one or more reactive powder metal alloys.

For example, disclosed bulk materials can include one or more powders capable of forming the following medical metals and alloys: austenitic, ferritic, martensitic and precipitation hardenable stainless steels per ASTM F899, 316L stainless steel per ASTM F138, commercially pure Titanium per ASTM F67, Ti 6Al 4V per ASTM F1472, Ti6Al4V ELI per ASTM F136, Ti 6Al 7Nb per ASTM F1295, Nitinol per ASTM F2063, Cobalt Chromium Molybdenum (CoCrMo) per ASTM F75 or ASTM F1537, Cobalt Chromium Tungsten per ASTM F90, Cobalt Nickel Chromium per ASTM F562, and combinations thereof, and other novel alloys designed to have specific properties conducive to medical device function such as radiopacity or MRI compatibility.

The bulk materials can include austenitic, martensitic, ferritic, and precipitation hardenable stainless steels per ASTM F899, which may be particularly useful in forming instrument and tooling parts.

The bulk materials can include powders capable of forming an implantable austenitic stainless steel alloy (e.g., 316L stainless steel per ASTM F138), which may be particularly useful in forming parts for medical and surgical applications. An austenitic stainless steel generally has sufficient corrosion resistance for biocompatibility, excellent elongation, is relatively low cost and is readily fabricated.

The bulk materials can include powders capable of forming a precipitation hardened stainless steel alloy (e.g., 17-4PH stainless steel per ASTM F899), particularly for producing non implanted parts that exhibit a good balance between corrosion resistance and strength. The strength and hardness can be modified by adjusting the temperature at which the part is heat-treated as part of the finishing step after sintering. The precipitation-hardened alloy generally provides for better corrosion resistance than 400 series stainless steels and better strength than 300 series stainless steels.

The bulk materials can include powders capable of forming a martensitic stainless steel (e.g., 420 or 440 per ASTM F899). These non-implanted materials exhibit the highest hardness and strength among the stainless steels with some tradeoff in corrosion resistance.

The bulk materials can include powders capable of forming novel metallic alloys or mixtures of ceramics and metals designed to have specific properties conducive to medical device function such as wear resistance, radiopacity or MRI compatibility.

The bulk materials can include a combination of low alloy steel, carbon, nickel, and molybdenum. This combination provides for a multi-purpose, economical material for non-medical applications that provides flexibility in various properties such as strength, hardness, and wear resistance.

The metal or metallic powders of the bulk materials may be produced by gas atomization or by other methods. Particularly with regard to bulk materials used to extrude preforms that will be further processed thermally, mechanically, and/or thermomechanically, the bulk materials may include low cost titanium powders having a very coarse structure that may be made by the direct reduction of titanium chloride.

The bulk materials can further include any one or more radiopaque materials that preclude penetration of x-rays or other types of radiation commonly used in diagnostic imaging, which may be particularly advantageous in the medical device field.

Disclosed binders can include one or more materials commonly used as binders in metal injection molding techniques. Such binder materials can be compatible with one or more of the bulk materials just described, as well as extrusion and other processing techniques described herein.

In some embodiments, a suitable binder can include a melt extrudable organic or inorganic compound that can be removed using one or more of a thermal extraction technique, a solvent extraction technique, a supercritical fluid extraction technique, an aqueous extraction technique, and/or a reactive chemical extraction technique (e.g., a process using a chemical debinding agent).

Some binders include a polymer binder. For example, a suitable binder can include a combination of two or more polymeric materials. A binder can include a polymer configured to provide a sufficient strength when melted to maintain a cross-sectional shape of an extruded workpiece during and after an extrusion technique. Such binders can include one or more of various plastics, thermoplastics, waxes, and acrylic thermosetting resins. The binders may include inorganic materials, particularly when used in combination with a bulk material that includes a ceramic material. For example, a suitable binder system can include an agar, reactive, thermally unstable or aromatic (e.g., naphthalene or paradichlorobenzene) binder system, which dries, reacts to form a gas, decomposes to a gas or sublimes at relatively low temperatures, such as, for example, below about 500° F., such as between about 120° F. and about 450° F.

Feedstock can be formed by mixing one or more suitable bulk materials with a binder system, together with any other desired components such as, for example, a radiopaque material to form a mixture having a substantially uniform composition. In such a mixture, any metal powders, ceramic powders, or combined metallic and ceramic powders are thoroughly wetted by the polymer and/or inorganic binder components.

In some instances, a proportion of binders to bulk material powders is in the range of about 40% to about 65%, by volume. Feedstock components (e.g., binders and bulk materials) can be mixed using a conventional mixing apparatus. A temperature at which the materials are mixed can vary, depending, for example, on the particular materials selected for the feedstock. For convenience, a resulting feedstock mixture can be flowable at a temperature and a pressure close to an ambient temperature and pressure. A flowable feedstock mixture can allow the mixture to fill crevices and small dimensional features of a die aperture and/or mandrel through which the mixture will flow to form an extruded workpiece.

Debinding

During debinding, one or more portions of a binder system, such as organic and/or volatile components, are removed from the workpiece (sometimes referred to in the art as a "green form"). The binders can be removed by heating a green form workpiece 100 (FIGS. 1A through 3C), such as with a low-temperature thermal treatment in a debinder 140 (FIG. 2). A debinding temperature can be between about 120° F. and about 750° F., such as, for example, about 250° F. When the green form is heated, a portion of the binders can melt, decompose, sublime, and/or evaporate. In general, a binder can be removed using one or more of the following techniques: (A) heating; (B) exposing the workpiece to a solvent, a supercritical fluid, or an aqueous extraction; (C) inducing a chemical reaction (e.g., a reactive chemical decomposition); or (D) a combination thereof.

After debinding, the workpiece is sometimes referred to as a "brown form."

Sintering

The brown form can be further consolidated to produce a finished article. During sintering, the brown form is heated to sufficient temperatures such that particles of the metal powders to adhere to each other, allowing diffusion processes to occur and thereby produce a substantially solid form having nearly the same density and/or other mechanical properties as the bulk material in a cast and/or a wrought form.

Sintering can include heating a brown form to a temperature close to a melting point of one or more of the constituent materials of the brown form, such as between about 20° F. and about 200° F. below a melting point of the bulk material. The sintering temperature can be maintained for a set period of time that may depend on several factors, including but not limited to a composition of the bulk material and a size of the workpiece portion. At the sintering temperature, interparticulate melting and substantial diffusion can occur, thereby substantially eliminating interstitial void spaces and causing the material densities to increase so that the form becomes a substantially solid, densified form.

Complete solidification of the part to 100% density might be desirable but can be difficult to achieve during sintering. A satisfactory density of the resultant material forming the sintered article can be greater than about 95% of the theoretical density of the solidified bulk material. In some instances, a density of the resultant material forming the sintered article can be greater than about 97% of the theoretical density of the solidified bulk material. These density measurement percentages are based on the theoretical density of the article, i.e., the density that would occur if there were no void spaces.

During sintering, the brown form typically shrinks, at least in part, due to a decrease in size of the interstitial void spaces between particles of the powdered bulk material and the corresponding densification of the green or brown form. Such shrinkage typically causes an article to be about 10% to about 30% smaller than the green form from which it is made (e.g., than the extruded workpiece), such as about 20% smaller than the green form. The amount of shrinkage should be considered when designing and/or selecting a die (or a die and mandrel combination) for extruding a workpiece intended to result in a finished article having a desired cross-sectional profile.

Support Members

As noted above, a long workpiece can be susceptible to stress-induced defects (e.g., internal or external fractures or reduction in cross-sectional area) resulting from shrinkage of the workpiece and friction between a workpiece and a support member during debinding, sintering or other processing. This is particularly true if the workpiece lies in a substantially straight line on a continuous surface.

Disclosed support members are configured to facilitate such shrinkage and to eliminate or reduce a likelihood of shrinkage stress-induced defects, such as those that can result from shrinkage of an extruded workpiece. For example, some disclosed support members substantially continuously support an elongate portion of a workpiece undergoing processing (e.g., debinding, sintering, or other processing). In some embodiments, a support member is configured to directly contact more than about 50% of a length of a workpiece undergoing processing.

In FIGS. 1A, 1B, 1C, 1D, 1E and 2, the extruded workpiece 100 is shown being substantially continuously supported by a support member, such as any of support members 120, 120', 120". Each of the illustrated support members 120, 120', 120" define an upper surface 122 defining a feature on which the workpiece 100 rests, thereby providing continuous, or substantially continuous, support to the workpiece.

In some embodiments, a support member 120, 120', 120" configured to provide substantially continuous support to a workpiece 100 is configured as a tray that can be moved among various processing stations (e.g, a debinder 140, a sinterer 141), as may be desired for batch processing one or more elongate workpieces. In other embodiments, the support member 120, 120', 120" is configured to provide substantially continuous support to a workpiece undergoing continuous processing. For example, a support member can be configured as an endless belt (e.g., a conveyor belt) or a plurality of juxtaposed members (e.g., rollers, pins, trays or walking beams).

As used herein, "batch processing" means processing a workpiece in a series of discrete steps that are applied to the entire workpiece. An example of batch processing includes extruding an entire workpiece, subsequently debinding all of the workpiece and after debinding, sintering all of the debound workpiece. The sintered workpiece can subsequently be wound on a spool (e.g., if the sintered workpiece is sufficiently long) or undergo other post-sintering processing.

As used herein, "continuous processing" means processing one or more portions of a workpiece substantially simultaneously with one or more other portions of the workpiece. An example of continuous processing is extruding a workpiece, while debinding a portion of the workpiece. As a further example of continuous processing, a debound portion of the workpiece can undergo sintering while a portion of the workpiece is being debound, while still other portions of the workpiece are being extruded. In some continuous processes, sintered portions of the workpiece undergo post-sintering processing simultaneously with one or more other portions undergoing extruding, debinding, and/or sintering. For example, as shown in FIGS. 1A through 2, a sintered portion 147 of a workpiece 100 can be wound on a spool 150, while other portions 106, 144 of the workpiece undergo other processing.

Figure 1E:
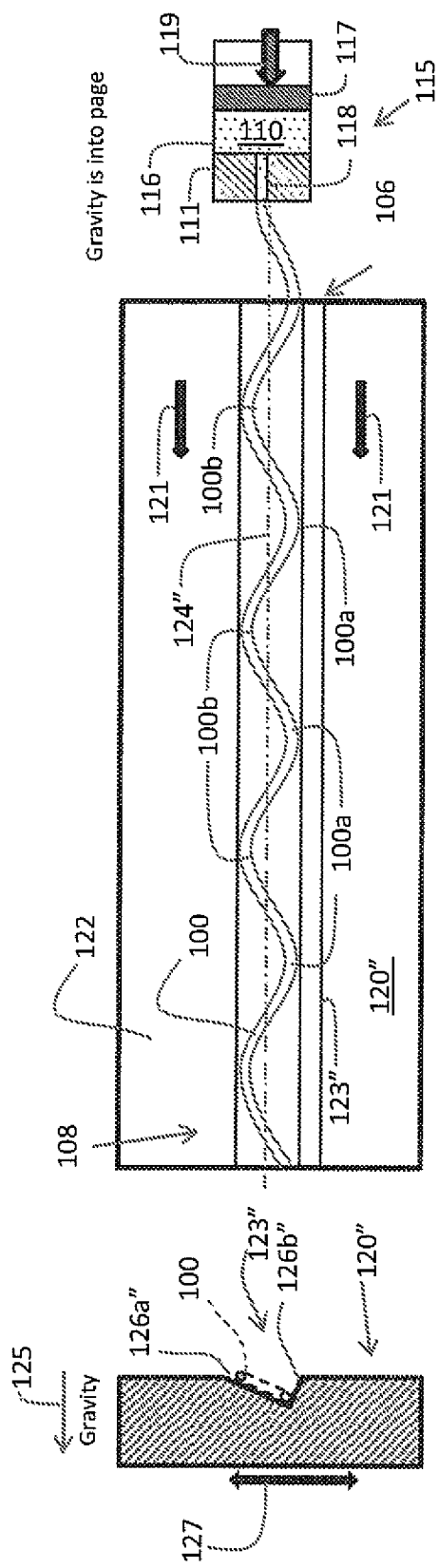
FIG. 1E shows a cross-sectional view of another embodiment of a support member of the type shown in FIG. 1D and FIG. 2.

In FIGS. 1A through 2, each of the illustrated support members 120, 120', 120" defines a respective longitudinally extending recess, or groove, 123, 123', 123" defining a corresponding center line axis 124, 124". The recess 123, 123', 123" can define any of a variety of contours or recess depths. In FIG. 1B, the recess is a generally U-shaped recess 123 having a substantially constant depth from the upper surface 122 of the support member along the centerline 124. In FIG. 1C, the recess 123' is a generally V-shaped notch, as described below. In FIG. 1A, the center line axis 124 extends along a deepest portion of the U-shaped recess 123 and V-shaped notch 123". In FIGS. 1D and 1E, the recess 123" is a generally L-shaped notch, as described below.

A support member 120 having a longitudinally extending recess 123, 123', 123" can receive an elongate workpiece 100, as shown in FIGS. 1A through 2. With some support member embodiments, the elongate workpiece 100 can be sinuously positioned so as to be substantially continuously supported by the member 120. As shown in FIGS. 1A through 2, an extruded workpiece 100 can be sinuously positioned on a support member 120 such that the workpiece generally lies transverse to the direction of gravity 125 (FIGS. 1A through 1E). In some instances, the workpiece 100 substantially lies in a horizontal plane.

The sinuously positioned workpiece 100 extends nonlinearly between two points A and B on the support member 120, 120', 120" such that a length of the workpiece extending between the two points is greater than a linear distance between the two points. In some instances, the sinuous contour approximates a sinusoidal contour.

A workpiece positioned as just described can accommodate subsequent processing-induced strains (e.g., "shrinkage"). For example, as shown in FIGS. 3A through 3C, as the workpiece 100 contracts during processing, portions 100a, 100b of the workpiece lying on opposing sides of the centerline 124, 124" (FIGS. 1A and 1D) can slide along a surface of the recess 123,123', 123" (FIGS. 1B, 1C and 1E) and approach the centerline, as indicated by the respective arrows 107a, 107b. As the workpiece 100 shrinks, internal stresses in the workpiece, aided by the force of gravity, mostly or wholly correspond to static and/or sliding friction between near-region portions 103, 104 of the workpiece 100 and the support member 120, keeping internal stresses below a threshold stress (e.g., well below a yield stress, stress rupture stress or an ultimate stress of the material or materials forming the workpiece). Sloped surfaces 126a, 126a', 126a', 126a", 126b" (FIGS. 1Bm 1C and 1E) of the recess 123, 123', 123" can further facilitate such sliding, since a component of the workpiece's weight (e.g., a component parallel to the sloped surface) can combine with the stresses in the workpiece to overcome a static and/or a sliding friction between the workpiece and the support member.

Disclosed apparatus configured to provide such gravity-aided shrinkage and/or substantially continuous support to a workpiece stand in sharp contrast to the apparatus disclosed in U.S. Pat. No. 3,697,262. For example, with the apparatus in the '262 patent, tensile stresses in a workpiece undergoing processing must overcome gravitational force since the workpiece is draped between adjacent support pins. With the approach described in the '262 patent, as a portion of the workpiece spanning a region between adjacent support pins shrinks during processing, the weight of the portion must be lifted against gravity, increasing internal stresses in the portion.

In contrast, sloped surfaces 126a, 126a', 126a', 126a", 126b" of a support member 120, 120', 120" allow at least a portion of gravitational forces to act in the same direction as the forces in a shrinking part. Accordingly, innovative support members 120 can facilitate lower internal stresses in a workpiece undergoing processing, and the lower stresses in turn produce fewer defects or fractures in the workpiece compared to earlier approaches.

Since internal stresses can correspond to a static and/or sliding friction between near-region portions 103, 104 of the workpiece 100 and the support member 120, internal stresses that a workpiece experiences during processing can be influenced, in part, by one or both of the arrangement of the workpiece on the support member and the selected configuration of the support member (e.g., a longitudinal recess or other feature defined by the support member). For example, as a distance 105 between apices 100a, 100b of the workpiece is reduced, shrinkage-induced internal stresses in a region of the workpiece between the apices can correspondingly reduce. Alternatively, as this distance increases, the internal stresses can correspondingly increase.

In addition, as the steepness of the walls defining the V-shaped notch, L-shaped recess or U-shaped trough increases, the component of gravity parallel to the walls in the direction of and assisting shrinkage increases, correspondingly reducing the internal stresses.

An elongate workpiece 100 can be received by the support member 120 in such a manner as to cause the workpiece to gather longitudinally into a sinuous configuration, as shown in FIGS. 1A. 1D and 2. For example, in FIGS. 1A and 1D, the workpiece 100 can be sinuously positioned on the support member 120, 120" as the support member receives the workpiece from the extruder 115.

In some instances, the support member moves away from the extrusion die 111, as indicated by the arrows 121. The support member 120, 120', 120" can move away from the extrusion die 111 at a slower speed than the speed of ejection of the elongate workpiece 100 from the die. Such a difference in speeds can provide a measure of slack in a malleable workpiece 100, thereby allowing the workpiece to be sinuously received by the support member 120, 120', 120".

A ratio of a length of a sinuously arranged workpiece 100 to a distance between two points A and B on the centerline axis 124, 124" longitudinally bisecting the sinuously positioned workpiece can correspond to a ratio of a speed of the support member 120, 120', 120" to a speed of ejection of a workpiece 100 from the extrusion die 111. For example, if a support member 120, 120', 120" moves away from a die 111 at a speed ten percent slower than the ejection speed of a workpiece 100, the workpiece can be sinuously positioned on the support member such that a straight line distance between two points A and B is a corresponding ten percent less than a length of the sinuously arranged workpiece. In addition, a length of the workpiece relative to the distance between points A and B can correspond to a degree of shrinkage expected during processing. For example, if a workpiece is expected to shrink at least ten percent during processing, the workpiece can be arranged such that its length is about ten percent greater than a distance between the points A and B. In some embodiments, a speed of the support member 120, 120', 120" moving away from the die 111 corresponds to a degree of expected part shrinkage.

The extruded workpiece 100 can be sinuously positioned on the support member 120, 120', 120" using a variety of approaches. For example, if a friction or other longitudinal retaining force is applied to a distal end portion 108 (FIGS. 1A, 1D) of an extruded workpiece 100 so as to prevent the distal end portion from moving relative to the support member 120, 120', 120", and the support member moves away from the extrusion die slower than the extrusion is ejected from the die, a longitudinally compressive load within the elongate workpiece (e.g., between the distal end portion and a newly extruded portion) can exceed a critical buckling load of the workpiece, causing the workpiece to buckle into a sinuous arrangement. Alternatively or additionally, an oscillator (not shown) can cause the support member 120, 120', 120" to reciprocate back and forth (as indicated by the arrow 127 in FIGS. 1B, 1C and 1E) in a direction transverse to a direction of travel of the workpiece 100 leaving the extrusion die 111, while the support member 120,120', 120" carries previously extruded portions of the workpiece away from the die.

As noted above, a support member can define a V-shaped notch 123' (FIG. 1C) extending longitudinally of the support member. One surface (e.g., 126a') of such a notch 123' can support the sinuously positioned workpiece 100 such that the one surface contacts the workpiece along its entire length (or at least an entire length of a sinuous portion of the workpiece). Another surface 126b' of the notch 123' can contact one or more of the apices 100a, 100b of the sinuously positioned workpiece 100 such that the other surface 126b' intermittently contacts the workpiece (e.g., as with the workpiece shown in FIG. 1E). In another approach, the workpiece can be sinuously arranged so as to span the deepest part of the V-shaped notch 123', as shown in FIG. 1C. With such a support member, gravitational force can cause, or at least facilitate, sliding along the one or both of the sloped surfaces 126a', 126b' during processing of the workpiece, reducing internal tensile stresses while still allowing the workpiece to shrink during processing. Such reduced tensile stresses can lead to fewer, or no, defects or fractures in a workpiece or finished article.

Other support member configurations that allow workpieces to shrink, particularly longitudinally, without fracturing are possible. Under one approach, the support member provides substantially continuous support of the workpiece without continuously contacting the workpiece. For example, the workpiece can rest atop a plurality of spaced apart ridges (not shown). Some support member surfaces are defined by a mesh structure having ridges extending in more than one direction. Disclosed support members (e.g., pins or spheres) can apply lower static and/or sliding frictional loads to a workpiece as it shrinks. Some support members can tilt to facilitate shrinking by enabling gravitationally aided sliding to occur as the brown form shrinks, thereby reducing the tendency of the friction against the setter tray to fracture.

Figure 14:
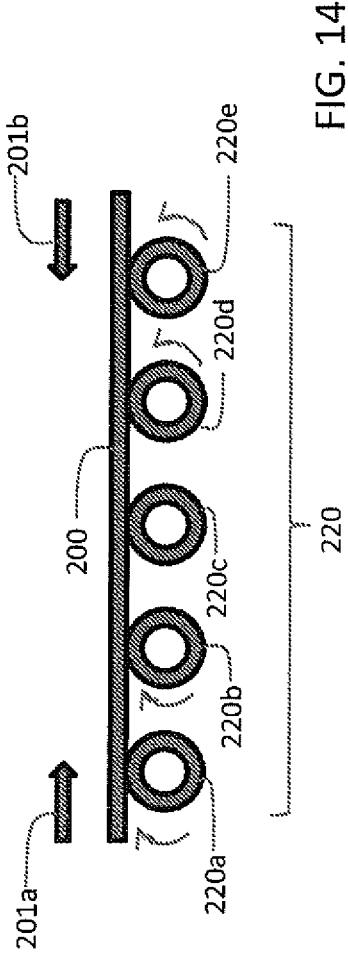

As noted above, disclosed support members provide substantially continuous support to a workpiece. In FIG. 14, a plurality of rollers 220 substantially continuously supports a workpiece 200 such that the workpiece can longitudinally contract (indicated by arrows 201a, 201b) during debinding and/or sintering. Such a contracting workpiece can travel across one or more of the rollers 220a, 220b, 220c, 220d, 220e. Depending on, for example, a diameter of the rollers 220, tensile stresses in the workpiece 200 can be substantially less than tensile stresses in an equivalent workpiece 100 substantially continuously supported by a support member 120 across which a portion of the workpiece slides. In some embodiments, the workpiece 200 lies in a substantially straight line across the rollers, and in other embodiments the workpiece 200 lies in a sinuous arrangement. In some instances, the rollers 220 do not pivot and are thus stationary pins. In such embodiments, the workpiece 100 can be sinuously arranged on the pins to facilitate low internal stresses during processing-induced shrinkage.

Figure 15:
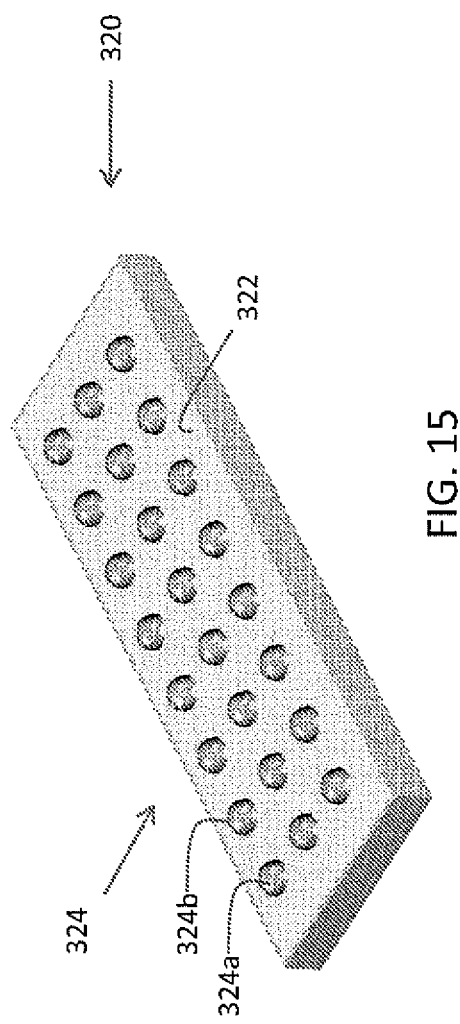
FIG. 15 shows an example of a portion of a support member defining upwardly extending projections configured to support an overlying workpiece.

As shown in FIG. 15, a support member 320 can define a generally planar surface 322 in combination with a plurality of upwardly extending projections 324. Although the upwardly extending projections 324 shown in FIG. 15 are portions of rotatable spheres, such upwardly extending projections can take many forms, such as, for example, fixed hemispheres, or other sections of spheres, ridges (e.g., cylindrical ridges, rectilinear ridges, ovular ridges), and interconnecting or intersection features, all being configured to support an overlying workpiece. In some embodiments, the upwardly extending projections 324 and the generally planar member 322 are fixed relative to each other, such as when they form a unitary construction.

In other embodiments, at least some of the upwardly extending projections 324 are rotatable relative to the planar surface 322 such that as a workpiece (not shown) moves relative to the support member 320, the projections in contact with the workpiece rotate relative to the planar member and roll along the workpiece (e.g., in combination with a degree of sliding along the workpiece, in some instances). Such rotatable projections can be substantially freely rotatable relative to the planar member. As used herein, "freely rotatable" means that the projections can rotate about one or more axes with a sufficiently low resistance imposed by a coupler and a retainer supporting the projections relative to the planar member that the projections rotate and roll along a workpiece as the workpiece shrinks such that substantially no sliding between the workpiece and the spheres occurs in the direction of rotation (e.g., perpendicular to an axis of the rotation).

Also, two or more such features can be combined in a single support member. For example, a support member 120, 120', 123" (FIGS. 1A through 1E) can define a longitudinally extending recess (e.g., a V-shaped, L-shaped or U-shaped recess) 123, 123', 123", as described above. One or more of the surfaces 126a, 126a', 126b', 126a", 126b" can define a plurality of upwardly extending projections 324 (FIG. 15), such as ridges, portions of spheres, and the like, configured to contact a workpiece lying within the recess and thereby support the workpiece. Such support members can further facilitate shrinkage of the workpiece and inhibiting fracturing of the workpiece.

Some support members (or setter trays) are made using one or more refractory ceramics such as alumina, zirconia, or magnesia.

Finishing

The extent of finishing applied to a sintered article can depend, at least in part, on whether the article is a net form, a near net form or a preform. Net forms require little or no processing or finishing after sintering, except for cutting the densified form to a desired length.

Near net products require little additional processing after sintering. Such processing can comprise finishing processes such as, for example, machining, forming, bending, straightening, grinding, abrasive blasting, surface finishing, polishing, tumbling, coating, plating, electropolishing, chemical etching, pickling, passivating, or some combination thereof.

Preform articles can be produced in profiled sections similar to those produced for net or near net products, but can be subjected to more substantial processing or finishing processes subsequent to sintering. Such processing of preforms can include, for example, conventional thermal, mechanical, and/or thermomechanical processing. For example, a preform might be subjected to cold working then annealing and/or hot working.

In some cases, after cutting the densified or wrought form to a desired length to produce an article, no additionally finishing is required, particularly if a net shape was extruded. However, for a near, net part, or for a part produced by thermomechanically processing a preform, finishing may include subjecting the densified form to conventional metal processing to refine the shape and size of the part. Any completed article produced by the continuous powder extrusion method can be further processed, regardless whether it was produced from a net form, a near net form, or a thermomechanically processed preform.

Finishing can include various processes to further refine the material properties of the article. These processes can include, but are not limited to, polishing, coating, grinding, machining, coining, heat treating and passivation. Finishing may improve mechanical properties of the finished article such as ultimate tensile strength, yield strength, and elongation, or improve surface finish, corrosion resistance, or dimensional precision. An article can be finished after being cut to a length, regardless whether the extrusion, debinding, and sintering steps produce a net form, a near net form, or a preform. An article can be machined to provide a smooth surface, threads, or other similar characteristics. An article can be electropolished, passivated, plated, or coated to enhance functionality, such as by improving corrosion resistance. An article can be annealed to relieve internal stresses or to soften the metal.

In some embodiments of continuous processing disclosed herein, finishing can include winding a sintered article 147 (FIG. 2) about a spool 150.

Exemplary Methods

Figure 16:
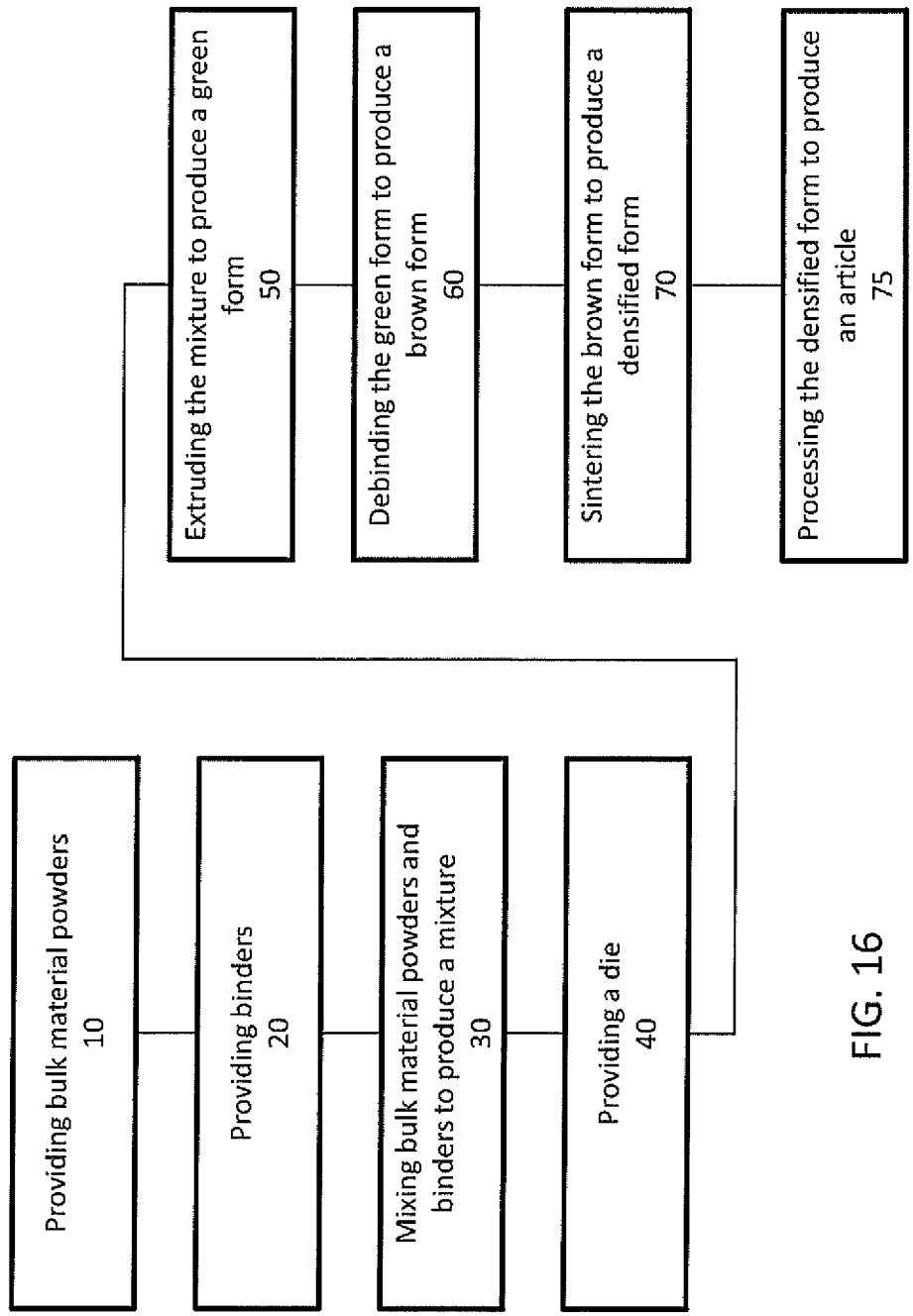
FIG. 16 illustrates an embodiment of a material process as disclosed herein.

Referring to FIG. 16, there is shown a schematic overview of a first exemplary method of producing an article. The method includes providing one or more bulk material powders 10, providing one or more binders 20, mixing the bulk material powders with the binders to form a mixture 30, providing a die (optionally including a mandrel for creating one or more lumens) 40, extruding the mixture through the die (optionally including the mandrel) to produce a green form 50, debinding the green form to produce a brown form 60, sintering the brown form to produce a densified form 70. In some instances, the densified form can be processed to produce a finished article 75.

In methods according to FIG. 16, support members described above can be used. In FIG. 16, the act of providing a bulk material powder 10 can include providing any bulk material powder suitable for powder extrusion techniques, such as, for example, any of the types of bulk material powders described herein. Such bulk material powders can include one or more powders of a metallic or a ceramic material suitable for sintering. A selected powder type, and a selected particulate size, can depend, at least in part, on a composition (e.g., an alloy) of the bulk material, a desired configuration of form to be produced, and any subsequent processing that may be used (e.g., whether the workpiece will be subsequently wrought).

The act of providing one or more binders 20 can include providing any of the one or more binder systems described herein. The act of mixing the bulk material powders with the binders to form a mixture 30 can include any suitable process of mixing now known or developed in the future.

The act of providing a die 40 can include providing a suitable die as described herein.

The act of extruding the mixture (e.g., a feedstock) through the die to produce a green form 50 can include forming a desired cross-sectional profile, which can be a solid or a hollow profile. The mixture of bulk material (metal, ceramic, or combined metal and ceramic) powders with polymer and/or inorganic binders (feedstock 110 (FIG. 1)) can be fed into an extruder 115. The mixture can be heated to form a flowable mixture. The flowable mixture can be continuously extruded through the die 111 or through an annulus or plural annuli defined by walls of the die and one or more mandrels positioned within the die aperture.

The act of extruding the mixture can also include receiving the extruded workpiece 100 on one or more support members 120 (sometimes referred to as a setter tray). In some embodiments, the support member is an endless belt member. In other instances (e.g., FIG. 14), the support member includes a plurality of juxtaposed support members 200 longitudinally aligned so as to be configured to receive a continuous (or at least a "long") workpiece (e.g., an extruded workpiece 200). The support member can be configured with a groove, a notch, ridges, pins, rollers or any other feature configured to provide substantially continuous support to a workpiece, such as a sinuously positioned workpiece.

The act of debinding 60 can include any of the approaches to debinding described herein. For example, the act of debinding can include one or more of drying, reacting, decomposing, sublimating and evaporating a binder system as disclosed herein.

The act of sintering 70 can include any suitable sintering process for densifying the workpiece.

In some instances, the act of processing the densified form 75 can include one or more of spooling an elongate workpiece or finished article (e.g., winding the elongate workpiece or finished article about one or more spools); cutting a form to a length; subjecting the densified form to mechanical processing and subsequent thermal processing, and/or to thermomechanical processing (e.g., mechanical processing simultaneously with thermal processing); and finishing the article.

Other Embodiments

Using the principles disclosed herein, those of ordinary skill will appreciate a wide variety of possible embodiments of material processing systems, such as, for example those adapted to processing elongate powder extrusions.

This disclosure makes reference to the accompanying drawings which form a part hereof, wherein like numerals designate like parts throughout. The drawings illustrate specific embodiments, but other embodiments may be developed or formed, and structural or process changes may be made without departing from the intended scope of this disclosure. In short, the principles disclosed herein are not limited to the described embodiments.

All patent and non-patent literature cited herein is hereby incorporated by references in its entirety for all purposes.

Directions and references (e.g., up, down, top, bottom, left, right, rearward, forward, etc.) may be used to facilitate discussion of the drawings but are not intended to be limiting. For example, certain terms may be used such as "up," "down,", "upper," "lower," "horizontal," "vertical," "left," "right," and the like. These terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" as well as "and" and "or."

Accordingly, this detailed description shall not be construed in a limiting sense, and following a review of this disclosure, those of ordinary skill in the art will appreciate the wide variety of interferometer systems that can be devised and constructed using the various concepts described herein. Moreover, those of ordinary skill in the art will appreciate that the exemplary embodiments disclosed herein can be adapted to various configurations without departing from the disclosed concepts. Thus, in view of the many possible embodiments to which the disclosed principles can be applied, it should be recognized that the above-described embodiments are only examples and should not be taken as limiting in scope. Therefore, we claim as our invention all that comes within the scope and spirit of the following claims.

What is claimed is:

1. A method for providing a sintered article of manufacture, the method comprising the steps of:
   (a) providing an extruder containing a feedstock comprising a mixture of a powdered bulk material and a binder system;
   (b) providing a debinder apparatus downstream from the extruder;
   (c) providing a sintering apparatus downstream from the debinder apparatus;
   (d) providing a support member extending from the extruder to at least the debinder apparatus, the support member comprising a non-planar cross-section perpendicular to a longitudinal axis of the support member;
   (e) extruding the feedstock in the form of a green workpiece supported on the support member, the green workpiece comprising a green workpiece length that extends nonlinearly between two points on either side of the support member so that the green workpiece length is greater between the two points than a linear distance between the two points along the support member; and
   (f) moving the green workpiece from the extruder to the debinder apparatus to form a brown workpiece, and then moving the brown workpiece from the debinder apparatus to the sintering apparatus to form the sintered article of manufacture.

2. The method of claim 1, including extruding the green workpiece having a generally sinusoidal shape extending between the two points along the support member.

3. The method of claim 1, including selecting the powdered bulk material for the feedstock from the group consisting of a powder metal, a powder ceramic, a powdered plastic, and combinations thereof.

4. The method of claim 1, including selecting the non-planar cross-section of the support member from the group consisting of a V-shaped notch, an L-shaped recess, and a U-shaped trough.

5. The method of claim 1, further comprising inducing relative movement between the extruder and the support member to thereby orient the green workpiece on the support member transversely to a direction of gravity.

6. The method of claim 5, wherein the relative movement between the support member and the extruder is selected from the group consisting of:

(a) oscillating transverse movement relative to a direction of movement of the green workpiece from the extruder;
(b) non-oscillating transverse movement relative to a direction of movement of the green workpiece from the extruder;
(c) longitudinal movement of the support member relative to the extruder; and
d) combinations thereof.

7. The method of claim 1, including providing the support member as a conveyor belt.

8. The method of claim 1, including moving the support member and the green workpiece away from the extruder at a slower rate than the feedstock is extruded from the extruder.

9. The method of claim 1, including providing the sintered article of manufacture having a substantially linear shape.

10. The method of claim 1, including continuously extruding the feedstock so that a green workpiece portion resides adjacent to the extruder while a contiguous sintered article of manufacture portion exits the sintering apparatus.

11. The method of claim 1, including:
(a) continuously extruding the feedstock to form the green workpiece supported on the support member;
(b) continuously debinding the green workpiece to form the brown workpiece supported on the support member; and c) continuously sintering the brown workpiece to form the sintered article of manufacture.

12. The method of claim 11, wherein the sintered article of manufacture has a net form, a near net form, or is a preform.

13. The method of claim 1, including spooling the sintered article of manufacture onto a spooler.

14. The method of claim 1, including cutting the sintered article of manufacture into a desired length.

15. A method for providing a sintered article of manufacture, the method comprising the steps of:

(a) providing an extruder containing a feedstock comprising a mixture of a powdered bulk material and a binder system, the powdered bulk material being selected from the group consisting of a powder metal, a powder ceramic, a powdered plastic, and combinations thereof;
(b) providing a debinder apparatus downstream from the extruder;
(c) providing a sintering apparatus downstream from the debinder apparatus;
(d) providing a support member extending from the extruder to the sintering apparatus, wherein at least from the extruder to the debinder apparatus, the support member comprising a non-planar cross-section perpendicular to a longitudinal axis of the support member;
(e) extruding the feedstock in the form of a green workpiece supported on the support member, the green workpiece comprising a green workpiece length having a sinusoidal shape extending between two points on either side of the support member axis so that the green workpiece length is greater between the two points than a linear distance between the two points along the support member; and
(f) continuously moving the green workpiece from the extruder to the debinder apparatus to form a brown workpiece supported on the support member, and continuously moving the brown workpiece from the debinder apparatus to the sintering apparatus to form the sintered article of manufacture.

16. The method of claim 15, including moving the support member and the green workpiece away from the extruder at a slower rate than the feedstock is extruded from the extruder.

17. The method of claim 15, wherein the brown workpiece has a shape that more closely approximates a linear axis than the sinusoidal shape of the extruded green workpiece.

* * * * *